Figure 1:
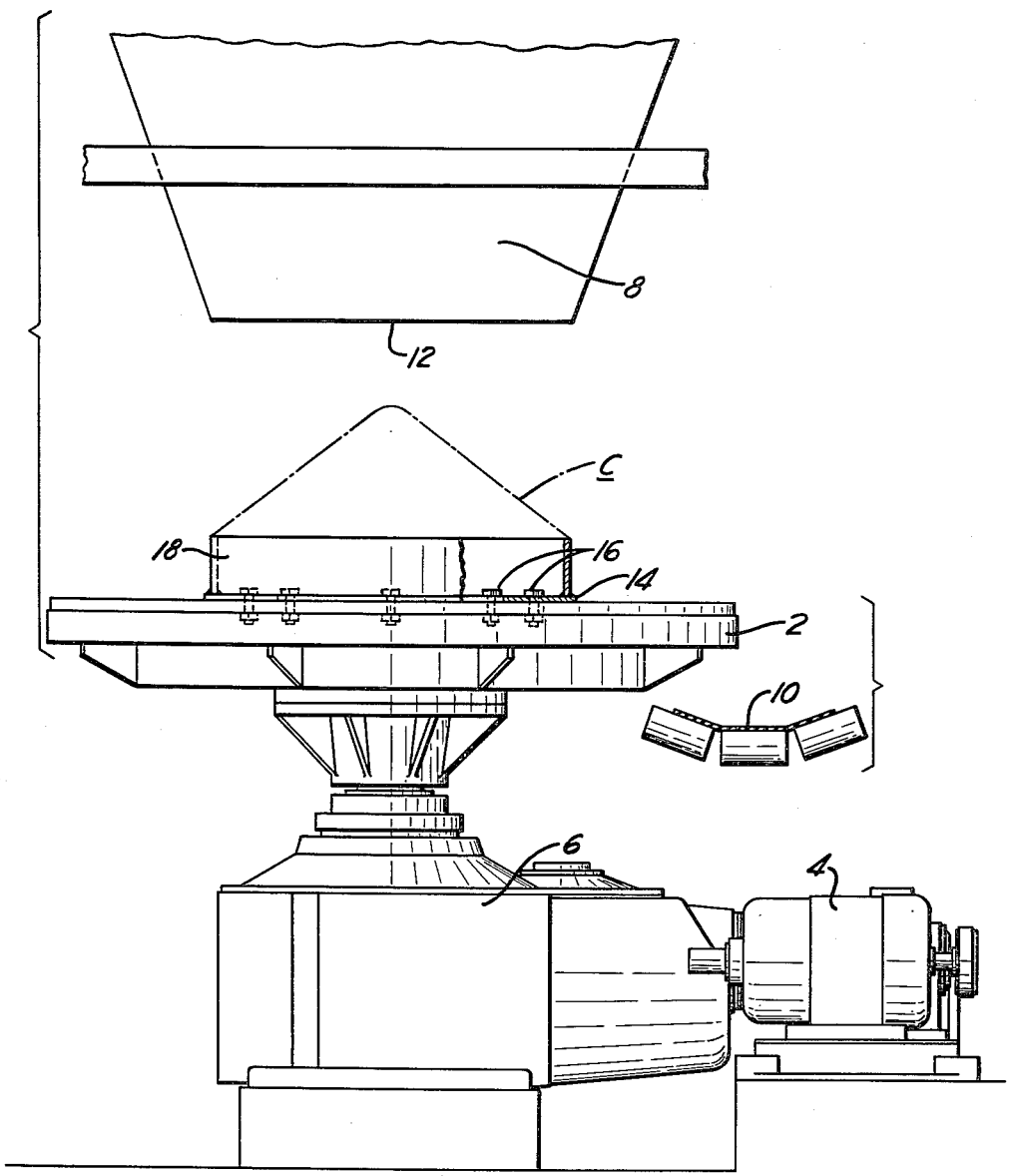

Sept. 18, 1962 F. E. DAVIS ET AL 3,054,497
ROTARY FEEDER TABLE
Filed March 30, 1960 2 Sheets-Sheet 1

INVENTORS
FLOYD E. DAVIS and
BRONNIE F. KRANE
By Donald G. Dalton
ATTORNEY

# United States Patent Office 3,054,497
Patented Sept. 18, 1962

3,054,497
ROTARY FEEDER TABLE
Floyd E. Davis, Gary, and Bronnie F. Krane, Hammond, Ind., assignors to United States Steel Corporation, a corporation of New Jersey
Filed Mar. 30, 1960, Ser. No. 18,644
1 Claim. (Cl. 198—52)

The present invention relates generally to material handling apparatus and more particularly to an improved rotary feeder table especially suitable for transferring sinter mix material from an overhead hopper to a belt conveyor.

In modern sintering plants where iron ore, coke and sinter fines are processed into sinter particles for charging into blast furnaces the usual arrangement of apparatus includes overhead hoppers which contain the sinter mix materials, a weighing conveyor disposed beneath the hoppers, and a transfer conveyor for carrying the sinter mix materials from the weighing conveyor to the sinter mixing machine. In installations of this type a rotary feeder table is usually provided between the discharge opening of the hopper and the weighing conveyor for receiving the sinter material from the hopper and transferring it to the weighing conveyor. The rotary feeder table is power driven and rotates under an adjustable plow bar which sweeps the sinter material from the feeder table surface onto the weighing conveyor. To aid in controlling the flow of material as it descends from the hopper onto the feeder table, the table is provided with a centrally located upstanding cone pedestal. The cone pedestal is located below the discharge opening of the hopper so that the sinter mix material being discharged from the hopper cascades over the cone pedestal and is thereby deflected to the peripheral portion of the feeder table from which it is scraped onto the weighing conveyor by the plow bar. The cone pedestal is in the form of a hollow casting.

A serious disadvantage inherent in the above-described type of feeding arrangement resulted from the abrasive nature of the materials making up the usual sinter mix. These materials include iron ore, coke, sinter fines, and, frequently, lime and dolomite also. Prior to our invention these sinter materials sliding over the cone pedestal had nothing to retard their flow and downward travel. As a result, the material would be deflected in such a quantity and at such a high velocity as it cascaded over the cone that it would overflow from the feeder table around its entire periphery. The abrasive action of the flow of the material eventually caused the cone to wear through prematurely so that it was necessary to shut down the feeder table and halt its operation to permit repairs or replacement to be made.

It is, accordingly, the primary object of our invention to provide an improved rotary feeder table wherein the cone pedestal is eliminated and means are provided for forming a center cone upstanding on the table made up of the materials being charged onto the table.

Figure 2:
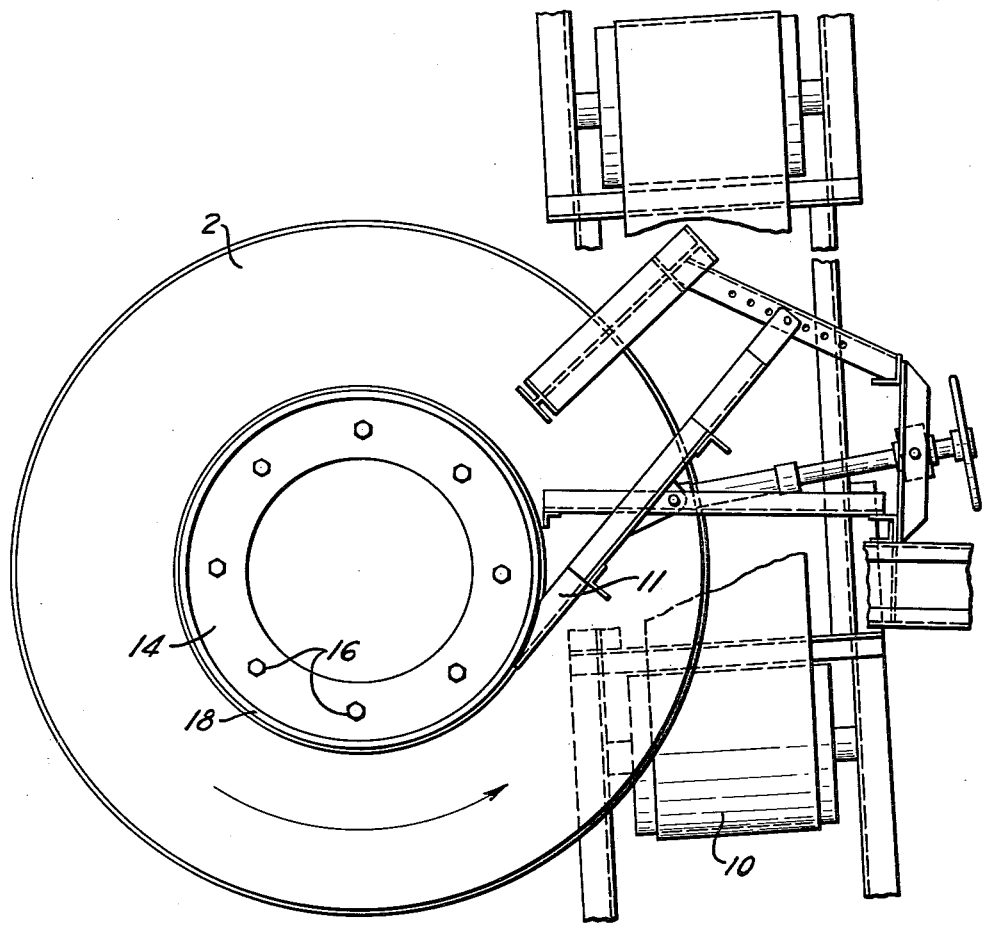

This and other objects will become more apparent after referring to the following specification and attached drawings, in which:

FIGURE 1 is a front elevational view with parts omitted for clarity; and
FIGURE 2 is a top plan view.

Referring more particularly to the drawing reference numeral 2 designates a rotary feeder table which is driven by a motor 4 through a drive mechanism 6. The table 2 is disposed below the bottom discharge opening of a sinter material hopper 8 and functions to receive material from the hopper and transfer it onto a belt conveyor 10 which is disposed beneath and tangentially of the periphery of the table. As the table rotates in the direction indicated by the arrow in FIGURE 2, the material is swept off the surface of the table onto the conveyor by means of an adjustable plow bar 11.

The structure thus far described is conventional and is not claimed as my invention which will now be described.

A renewable circular plate 14 having a central opening therethrough is removably mounted on the upper surface of the table 2 concentric therewith by means of bolts 16. It will be noted that although I have shown the use of bolts for removably attaching plate 14 to the table, any other means, as desired, may be used for this purpose. A renewable ring 18 is welded on the plate 14 and is concentric with the table 2.

In operation, as the sinter material falls from the hopper 8, it accumulates in the upstanding ring 18 and builds up to form a cone-shape pile C, as best shown in FIGURE 2. As the material continues to be discharged from the hopper 8 after the cone pile C is formed it cascades over the cone pile and its flow is deflected to the periphery of the table 2 by the cone pile. The sinter mix material making up the cone pile C is held in place by the upstanding ring 18 so that an operating angle of repose is maintained and the increased friction caused by the material sliding on itself retards its free flow.

While one embodiment of our invention has been shown and described, it will be apparent that other adaptations and modifications may be made without departing from the scope of the following claim.

We claim:

In a mechanism for feeding material including a rotary feeder table, a hopper having a bottom discharge opening spaced above said table, and means for sweeping the surface of said table the improvement therewith of an imperforate generally vertical wall attached to said table to form a ring generally concentric with said table, the diameter of said ring being less than the diameter of said table, said ring being concentric with the vertical axis of said discharge opening whereby a cone of said material is formed in said ring as said material is discharged from said opening.

References Cited in the file of this patent
UNITED STATES PATENTS
2,137,501     Myers _____ Nov. 22, 1938
FOREIGN PATENTS
465,947     Canada _____ June 20, 1950